(12) United States Patent
Hu et al.

(10) Patent No.: US 8,970,599 B2
(45) Date of Patent: Mar. 3, 2015

(54) DATA EXHIBITION METHOD AND SYSTEM BASED ON RING ANGLES

(71) Applicant: International Business Machines Corporation, Armonk, NY (US)

(72) Inventors: Bin Hu, Beijing (CN); Ke Qiang Chen, Beijing (CN); Guang Yu Liu, Bejing (CN); Xing Tian, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 51 days.

(21) Appl. No.: 13/721,616

(22) Filed: Dec. 20, 2012

(65) Prior Publication Data
US 2013/0194273 A1    Aug. 1, 2013

(30) Foreign Application Priority Data

Dec. 28, 2011   (CN) .......................... 2011 1 0447079

(51) Int. Cl.
*G06T 11/20*   (2006.01)
(52) U.S. Cl.
CPC ................................... *G06T 11/206* (2013.01)
USPC ...................................... 345/440; 345/440.2
(58) Field of Classification Search
CPC .... G06T 11/206; G06F 3/0481; G06F 17/246
USPC .............................................. 345/440, 440.2
See application file for complete search history.

(56) References Cited

U.S. PATENT DOCUMENTS

| | | |
|---|---|---|
| 6,320,586 B1 | 11/2001 | Plattner et al. |
| 6,400,366 B1 | 6/2002 | Davies et al. |
| 6,414,691 B1 | 7/2002 | Nakagawa et al. |
| 7,212,208 B2 | 5/2007 | Khozai |
| 2007/0024490 A1 | 2/2007 | Carter et al. |
| 2009/0327883 A1 | 12/2009 | Robertson et al. |
| 2010/0253686 A1* | 10/2010 | Alsbury et al. ............... 345/440 |
| 2011/0007075 A1* | 1/2011 | Lee ............................... 345/440 |
| 2012/0154348 A1* | 6/2012 | Okuno .......................... 345/204 |
| 2013/0127866 A1* | 5/2013 | Yamamoto et al. ........... 345/440 |
| 2013/0286039 A1* | 10/2013 | Hao et al. ..................... 345/440 |

FOREIGN PATENT DOCUMENTS

| | | | |
|---|---|---|---|
| JP | 03210591 A | * | 9/1991 |
| JP | 05174153 A | * | 7/1993 |

OTHER PUBLICATIONS

Weber et al, "Visualizing Time-Series on Spirals", IEEE Symposium on Information Visualization (InfoVis 2001), 6 pages.
Keim et al, "Pixel Bar Charts: A Visualization Technique for Very Large Multi-Attributes Data Sets", Information Visualization, 2001, 14 pages.

* cited by examiner

*Primary Examiner* — Chante Harrison
(74) *Attorney, Agent, or Firm* — Cantor Colburn LLP; Rahan Uddin

(57) ABSTRACT

Data values are exhibited based on sector-ring angles. The data values to be exhibited are first received by a processing device. The sector-ring angles are then determined for the data values to be exhibited. Using the sector-ring angles for the data values to be exhibited, the data values are exhibited in a sector-ring manner.

16 Claims, 8 Drawing Sheets

DATA EXHIBITION METHOD AND SYSTEM BASED ON RING ANGLES

PRIORITY

The present application claims priority to Chinese Patent Application No. 201110447079.9 filed on Dec. 28, 2011, and all the benefits accruing therefrom under 35 U.S.C. §119, the contents of which in its entirety are herein incorporated by reference.

BACKGROUND

The present invention relates to computer data processing and data exhibition. More specifically, the present invention relates to exhibiting data based on ring angles.

With the rapid development of computer technology, applications providing the collection, analysis, processing and exhibition of data are in demand. For example, during the process of monitoring information technology (IT) systems, a computer typically collects real-time monitoring data of a system's performance index. The collected data is then typically integrated and exhibited in order for an administrator to adjust resource assignments among various IT systems. Another industry where the collection, analysis, processing and exhibition of data are in demand is the medical industry. For example, in the medical industry, patient data and detection data of hospitals from various locations are typically collected, analyzed, and then exhibited to end users by computers.

SUMMARY

According to an embodiment, a computer-implemented method is provided for exhibiting data values based on sector-ring angles. The data values to be exhibited are first received by a processing device. The sector-ring angles are then determined for the data values to be exhibited. Using the sector-ring angles for the data values to be exhibited, the data values are exhibited in a sector-ring manner.

According to another embodiment, a computer system including a memory having computer readable instructions and a processor for executing the computer readable instructions is provided for exhibiting data values based on sector-ring angles. The computer system further includes a data value reception device configured to receive data values to be exhibited, an angle determination device configured to determine sector-ring angles for the data values to be exhibited, and an exhibition device configured to exhibit the data values in a sector-ring manner using the sector-ring angles for the data values to be exhibited.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments disclosed herein provide a data exhibition method and system based on ring angles. Data values of embodiments are exhibited based on sector-ring angles. The data values to be exhibited are first received by a processing device. The sector-ring angles are then determined for the data values to be exhibited. Using the sector-ring angles for the data values to be exhibited, the data values are exhibited in a sector-ring manner. According to embodiments, because data values are exhibited based on ring angles, it is possible to exhibit all collected data clearly in one graph no matter how large or small the difference may be between each data value to be exhibited. According to embodiments, comparison information between close data values is clearly and effectively exhibited to an end user though use of ring angles.

Figure 2:
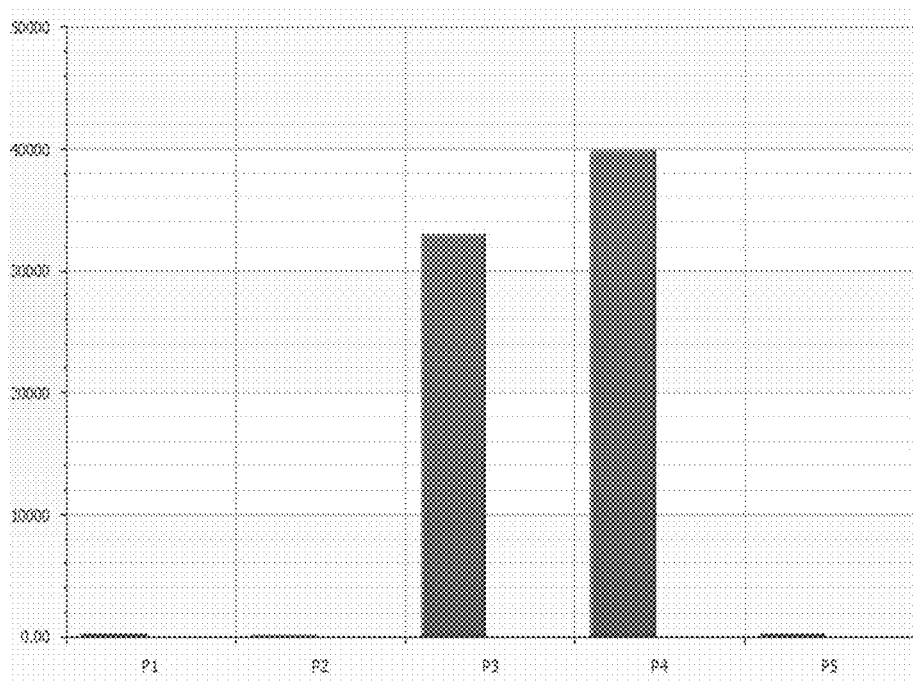
FIG. 2 shows a graph instance for data exhibition according to the contemporary art.

In the contemporary art, when a computer attempts to exhibit a group of related data in one diagram or table, a fixed exhibition scale must be determined. Accordingly, smaller data values fail to be exhibited effectively when the groups of data values differ greatly from each one another. Also, even though a group of data values may all be exhibited in one graph in the contemporary art, if two data values are relatively close to each other, then the comparison information between the data values cannot be acquired from a computer graph effectively and intuitively. FIG. 2 shows an instance wherein five pieces of data P1-P5 (P1=5, P2=7, P3=32500, P4=40000 and P5=3) are exhibited by a computer graph of the contemporary art. It can be seen from FIG. 2 that P1, P2 and P5 are hardly exhibited due to their values being extremely small with respect to P3 and P4. Thus, the magnitude information between P1, P2 and P5 can not be compared. If the scale in FIG. 2 is modified to exhibit P1, P2 and P5 effectively, then, obviously, P3 and P4 will exceed the display region which can be accommodated by a computer screen.

Accordingly, embodiments disclosed herein provide a method and system for exhibiting data values effectively and clearly even in the case where data values in a differ largely from each other. Embodiments further provide a method and system for clearly exhibiting comparison information between data values that are close to each other.

Figure 1:
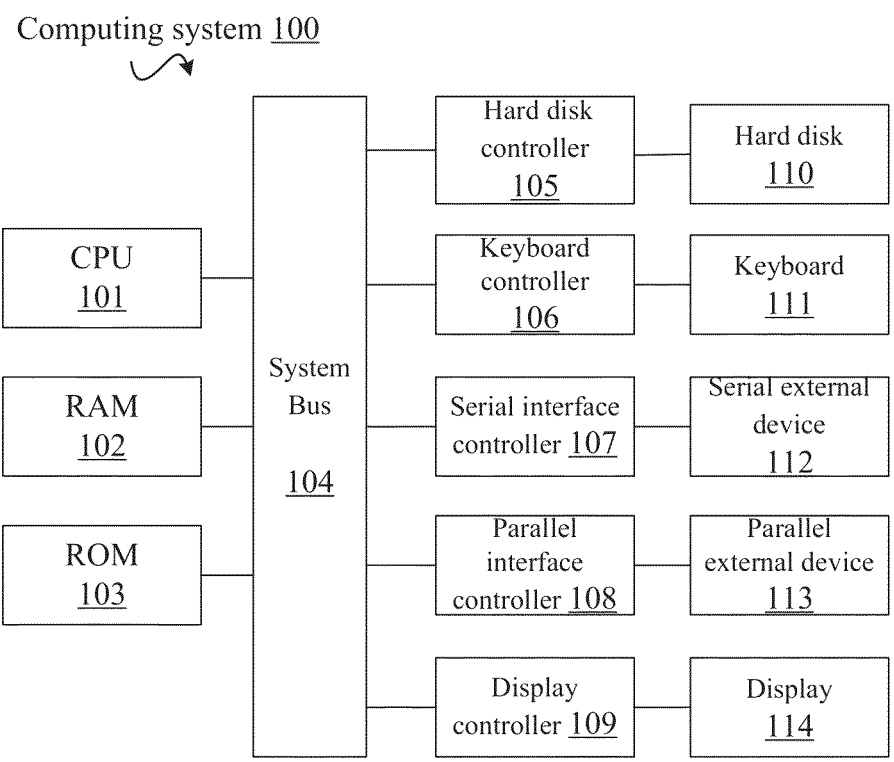
FIG. 1 shows a block diagram of an exemplary computing system according to an embodiment.

FIG. 1 shows a block diagram of an exemplary computing system 100 according to an embodiment. As shown, the computing system 100 may include a CPU (Central Processing Unit) 101, a RAM (Random Access Memory) 102, a ROM (Read-Only Memory) 103, a system bus 104, a hard disk controller 105, a keyboard controller 106, a serial interface controller 107, a parallel interface controller 108, a display controller 109, a hard disk 110, a keyboard 111, a serial external device 112, a parallel external device 113 and a display 114. Among these devices, coupled to the system bus 104 are the CPU 101, the RAM 102, the ROM 103, the hard disk controller 105, the keyboard controller 106, the serial interface controller 107, the parallel interface controller 108 and the display controller 109. The hard disk 110 is coupled to the hard disk controller 105, the keyboard 111 is coupled to the keyboard controller 106, the serial external device 112 is coupled to the serial interface controller 107, the parallel external device 113 is coupled to the parallel interface controller 108, and the display 114 is coupled to the display controller 109.

Figure 3:
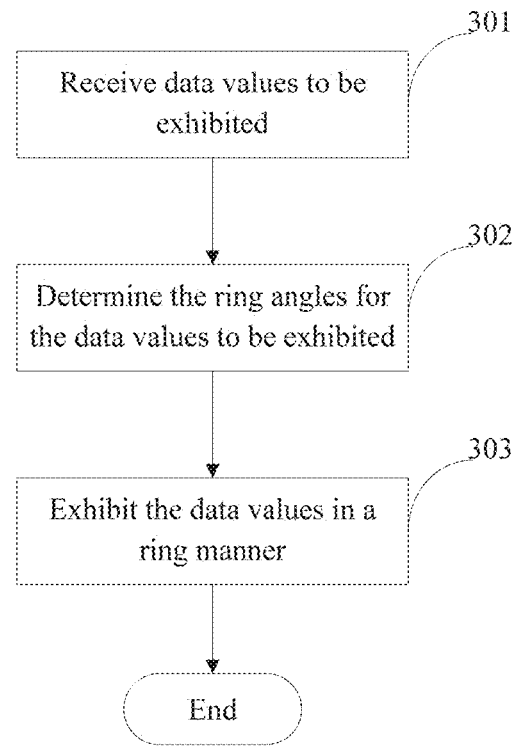
FIG. 3 shows a flowchart of a data exhibition method based on sector-ring angles according to an embodiment.

FIG. 3 shows a flowchart of a data exhibition method based on sector-ring angles according to an embodiment.

The method shown in FIG. 3 begins at block 301. At block 301, data values to be exhibited are received. The data values to be exhibited may be a set of data including multiple data values, for example {3, 5, 7, 32500, 40000}. According to an embodiment, the types of the data values to be exhibited may include one or more of a negative number, a positive number equal to or smaller than 1, and a positive number larger than 1. The origin of the data values to be exhibited may be the data collected automatically by a computer system during a monitoring process, or may also be the data input by a user.

Next, the method shown in FIG. 3 proceeds to block 302. At block 302, the sector-ring angles for the data values to be exhibited are determined. It is noted that the "sector-ring" of an embodiment may be not only be a full circular ring (i.e., the central angle is 360 degree) but may be a part thereof (i.e., the central angle is smaller than 360 degree). A sector-ring angle refers to the angle of the central angle corresponding to the sector-ring.

With respect to a group of data values to be exhibited, respective data values will be determined as having different sector-ring angles in accordance with a certain algorithm. In general, the larger the data value is, the larger the sector-ring angle is, but the two are not necessarily scaled to each other. In order to make the sector-ring angles (Rs) for multiple data values to be exhibited all meet $0° \leq R \leq 360°$, an embodiment introduces different scale coefficients to different intervals within the exhibition region.

For example, if only three numbers {3, 5, 7} need to be exhibited and those numbers do not differ from each other largely, then sector-ring angles with equal scales may be utilized. Assuming that the fixed scale coefficient of the sector-ring angles is 30, the sector-ring angle for the data value 3 to be exhibited is 90°, the sector-ring angle for the data value 5 to be exhibited is 150°, and the sector-ring angle for the data value 7 to be exhibited is 210°. Thus, all of the three data values can be exhibited within the range of 360° centered at one origin or pole in one plane.

However, if five data values {3, 5, 7, 32500, 40000} that differ from each other largely need to be exhibited, it is difficult to display all five data values clearly and effectively within an interval of $0° \leq R \leq 360°$ around one origin or pole in one plane no matter what kind of fixed scale coefficient is selected. Therefore, embodiments provide a changeable scale coefficient to the interval of $0° \leq R \leq 360°$ centered at a certain origin.

For example, by the aid of a plane rectangular coordinate system, the scale coefficient within the first quadrant interval of 0°-90° is made to be 10 (the data value for completing the first quadrant is 90/10=9), the scale coefficient within the second quadrant interval of 90°-180° is made to be 0.1 (the data value for completing the second quadrant is 90/0.1+9=909), the scale coefficient within the third quadrant interval of 180°-270° is made to be 0.01 (the data value for completing the third quadrant is 90/0.01+909=9909), and the scale coefficient within the fourth quadrant interval of 270°-360° is made to be 0.001 (the data value for completing the fourth quadrant is 90/0.001+9909=99909), then the value of the sector-ring angle for the data value 3 to be exhibited is 3×10=30°, the value of the sector-ring angle for the data value 5 to be exhibited is 5×10=50°, the value of the sector-ring angle for the data value 7 to be exhibited is 7×10=70°, the value of the sector-ring angle for the data value 32500 to be exhibited is 70°+(32500−9909)×0.001=292.59°, and the value of the sector-ring angle for the data value 40000 to be exhibited is 270°+(40000−9909)×0.001=300.09°. It should be noted that the example above is only one of the schemes to determine scale intervals and the corresponding scale coefficients of respective scale intervals of an embodiment, and those skilled in the art may employ many mathematic methods to determine the scale intervals and the corresponding scale coefficients. For example, the scale intervals may not be divided in accordance with respective quadrants of the plane rectangular coordinate system; instead, the entire 360° interval centered at a certain point is divided into three scale intervals with 120° per interval. Also, the scale coefficients set within respective intervals may not be similar to such a changing trend of 10, 0.1, 0.01, but may be in any changing trend, for example a trend of 8, 0.2, 0.0005. Hereinafter, some specific embodiments for determining scale coefficients and scale intervals will be discussed.

Figure 5A:
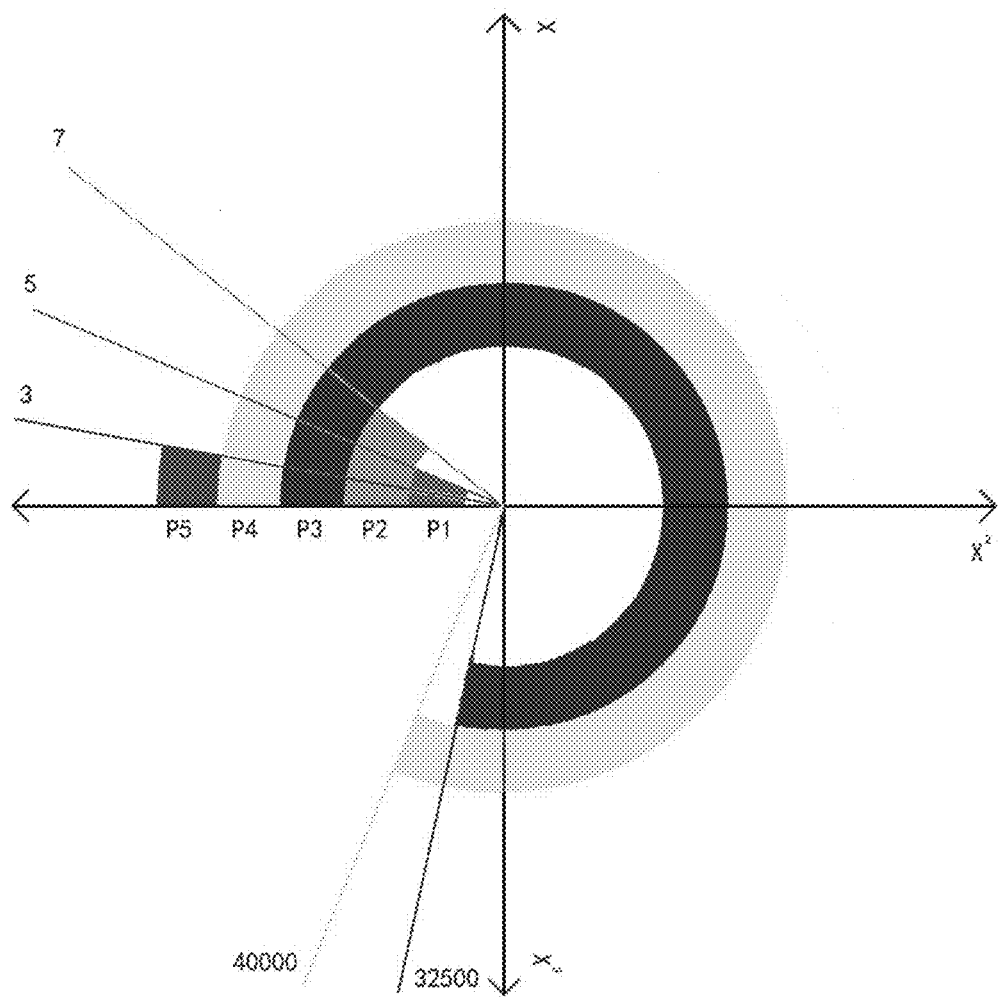
FIG. 5A shows an instance of performing the data exhibition with sector-ring angles according to an embodiment.

Next, at block 303, the data values are exhibited in a rectangular coordinate system in a sector-ring manner by using the sector-ring angles, determined at block 302, for the data values to be exhibited. "In a sector-ring manner" refers to each data value being exhibited as a sector-ring, and further, the sector-ring corresponding to respective data values that are arranged in parallel but do not overlap each other (see FIG. 5). According to an embodiment, the above five data values can be displayed clearly and effectively in the interval of $0° \leq R \leq 360°$ by introducing varying scale coefficients in different quadrants as shown in FIG. 5A. It is noted that there are many methods for determining scale coefficients or dividing intervals as described above, and that employing different scale coefficients or interval division methods will result in the final presentation results being different. According to an embodiment, different data values may be distinguished by different sector-ring colors to distinguish different data values. In FIG. 5A, different data values are may be distinguished by their shades of color. According to another embodiment, data values are denoted with prolonged lines and numbers as shown in FIG. 5A. The prolonged lines and numbers exhibit comparison information between respective data values clearly while providing accurate information for respective data values. The prolonged lines help to distinguish different data values. According to an embodiment, accurate data values may be calculated in a way that the information of scale intervals and scale coefficients and the values of the sector-ring angles corresponding to respective data values are provided in the exhibition result.

According to another embodiment, the sector-ring widths for exhibiting data values are determined before the data values are exhibited. The sector-ring width may be a fixed value or a default value, or may be a value which is adjusted dynamically according to the number of the data values to be exhibited.

According to another embodiment, taking the portion of the same axis of a plane rectangular coordinate system that is located at a same side of the origin as the start point, the data values are exhibited in the rectangular coordinate system in a sector-ring manner according to the sector-ring angles of the determined data values to be exhibited. For example, all the sector-rings for the data value exhibition in FIG. 5A are extended by taking the portion at the left side of the horizontal axis of the rectangular coordinate system as the start point and rotating clockwise. The purpose for doing so is to make the start points for the sector-rings corresponding to respective data values identical such that, especially in a case without specific number denotation, it is convenient to compare the magnitudes of the data values and their relationships. It should be understood by those skilled in the art that it is absolutely possible to extend sector-rings clockwise or anticlockwise by taking the portion of the horizontal axis at right side of the origin or any portion of the vertical axis located at the same side of the origin as the start point to exhibit data. According to another embodiment, sector-rings are extended clockwise or anticlockwise by taking the portion of any assistant axis in the rectangular coordinate system located at the same side of the origin as the start point. Here, the "assistant axis" refers to an axis that is different from x-axis or y-axis and added in the rectangular coordinate system according to for example an angle of 120° or any other angle. It is noted that the introduction of the plane rectangular coordinate system is not necessary, and an embodiment may be implemented with an interval of 360° centered at a certain point in any plane and may choose arbitrarily a radial where the start point is located and perform the exhibition in which sector-rings are extended on the basis of the radial as the start point. It is also noted that the "plane" indicated in an embodiment refers to a plane in a macro sense, and those skilled in the art may give a certain depth value to the sector-ring of the exhibition result by the aid of 3D technology such that the exhibition result has a spatially stereoscopic visional sense, and such a manner also falls within the scope of the macro-sensed "plane" indicated in an embodiment.

Figure 5B:
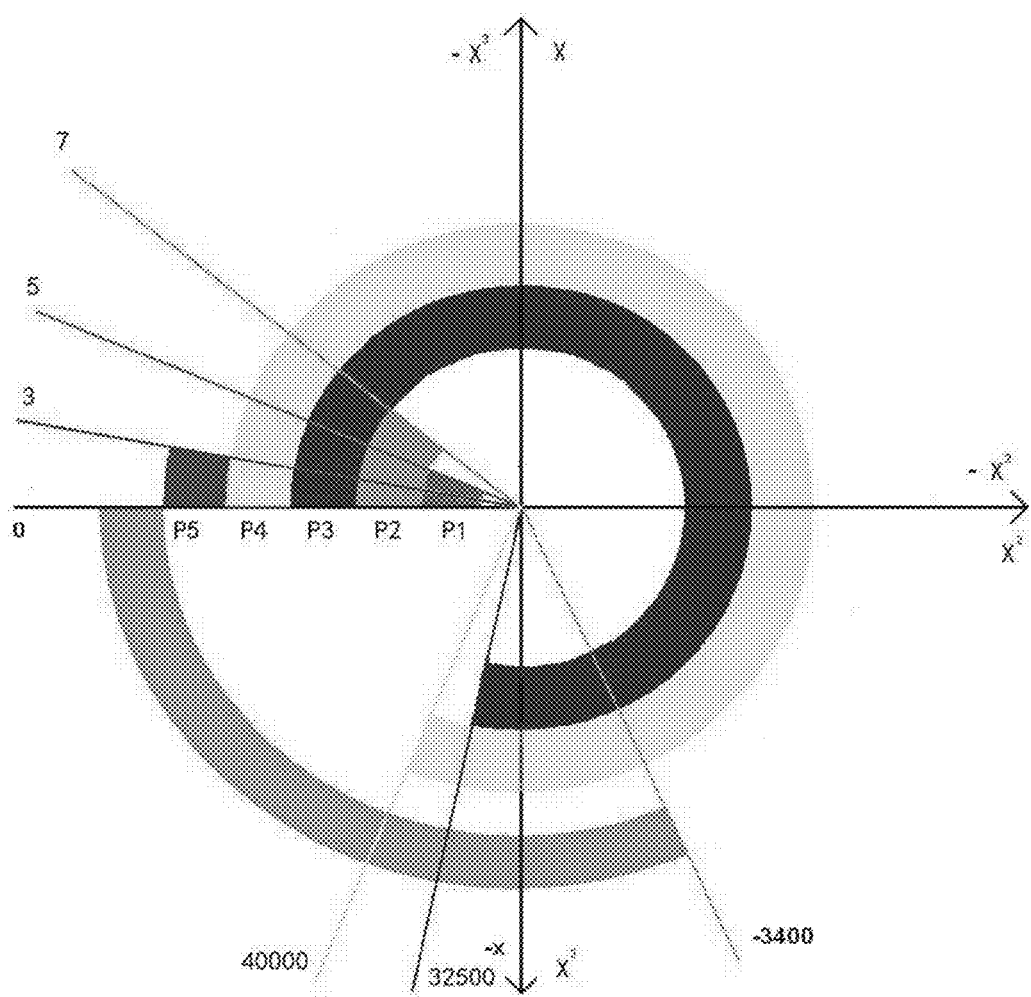
FIG. 5B shows an instance of exhibiting data values containing negative numbers with sector-ring angles according to an embodiment.

According to an embodiment, a negative data value may be exhibited in an opposite sector-ring extension direction simultaneously with a positive data value as shown in FIG. 5B. In FIG. 5B, the exhibition of a data value of −3400 is added. The exhibition of the data value of −3400, like the other five positive data values, takes the portion of the horizontal axis (x-axis) of the rectangular coordinate system located at left side of the origin as the start point. The difference is that the sector-ring for −3400 is extended anticlockwise while the sector-rings for other five positive data values are extended clockwise, thereby positive numbers and negative numbers are distinguished clearly. The determination process for sector-ring angles with respect to negative numbers is similar with that for positive data values.

As shown in FIGS. 3, 5A and 5B, it can be seen that, based on the data exhibition with sector-ring angles, no matter how large the data in a group of data values differs from each other, all the data can be exhibited collectively in one graph clearly and effectively. Additionally, no matter how close to each other the data values are, the comparison information between the data values may be exhibited effectively and clearly.

Figure 4:
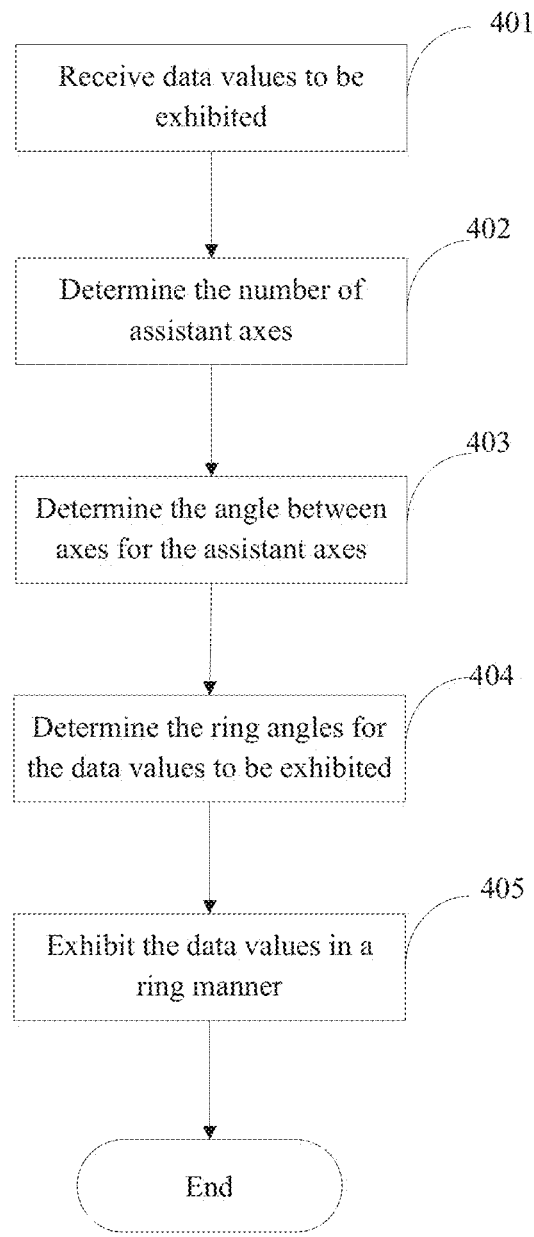
FIG. 4 shows a flowchart of a data exhibition method based on sector-ring angles according to a further embodiment.

FIG. 4 shows a flowchart of a data exhibition method based on sector-ring angles according to an embodiment.

Block 401 in FIG. 4 corresponds to block 301 in FIG. 3. Blocks 402-404 may be understood as a specific algorithm for determining sector-ring angles for data values. At block 402, the number of assistant axes is determined according to the data values to be exhibited, wherein the assistant axes indicate the boundaries of respective scale intervals having different scale coefficients. The assistant axis refers to an axis for distinguishing scale intervals in a display region and is generally not exhibited in the final exhibition result (or may also be exhibited optionally) but is only used to determine the sector-ring angles for the data values to be exhibited. The number of assistant axes indicates the number of scale intervals in the rectangular coordinate system.

According to an embodiment, the number of assistant axes is determined according to the following expressions (1) or (2).

$$N=[\log_{2\pi} A_{max}]+1 (A_{min} \geq 1) \quad (1)$$

where N is the number of assistant axes, [ ] indicates rounding, and $A_{max}$ indicates the maximum value in a group of data values to be exhibited. Assuming that the group of data values to be exhibited is {2, 3, 5000, 20000}, $A_{max}$=20000 and accordingly N=[$\log_{2\pi}$200000]+1=7, that is, the number of assistant axes is 7, thus the number of scale intervals is 7. According to this embodiment, a fixed base $2\pi$ for the logarithm calculation is utilized when the number of assistant axes or scale intervals is calculated. It should be noted that one assistant axis, among seven assistant axes, may directly use for example the axis (the horizontal axis or the vertical axis) where the start point in the rectangular coordinate system is located.

According to another embodiment, the number of assistant axes is determined according to the following expression (2).

$$N=[\log_X A_{max}]+1 (A_{min} \geq 1) \quad (2)$$

where N is the number of assistant axes, [ ] indicates rounding, $A_{max}$ indicates the maximum value in the group of data values to be exhibited, $A_{min}$ indicates the minimum value in the group of data values to be exhibited, and X indicates an axis amplitude coefficient which is the base, input by a user, in the logarithm calculation for determining the number of assistant axes. According to this embodiment, a user may by himself input the value of X according to the required number of assistant axes. According to this embodiment, it is assumed that the group of data values to be exhibited is {2, 3, 5000, 20000} and it is chosen that X=100, then $A_{max}$=20000 and accordingly N=[$\log_{100}$200000]+1=3.

Only the number of assistant axes is determined in block 402. Next, at block 403, an angle D between axes for the assistant axes is determined according to the determined number of axes, wherein the angle between axes indicates the range of respective scale intervals having different scale coefficients. According to one embodiment, whether the expression (1) or the expression (2) is used to determine the number of assistant axes, the angle D between axes is determined by using the expression (3).

$$D=360/N \quad (3)$$

where N is the number of assistant axes determined in block 402. The angle between axes refers to the degree of the angle between two adjacent axes. According to the expression (3), the degrees of the angles between axes determined for any two adjacent axes are equal. However, according to another embodiment, the number of axes may not be determined in accordance with the logarithm calculation of the expression (1) or (2), and the angle D between axes may not be determined in accordance with the expression (3). For example, it is possible to let the angle between the first axis and the second axis be 50 degrees, and to let the angle between the second axis and the third axis be 70 degrees, and so on. Even if the number of axes is not determined in accordance with the expression (1) or (2), or the degree of the angle between axes is not determined in accordance with the expression (3), the technical effect that all the data are exhibited in one rectangular coordinate system can still be realized. Those skilled in the art can determine the number of scale intervals (or assistant axes) and the degrees of the angles between axes (the ranges of the scale intervals) based on intervals with non-fixed scale coefficients.

Next, at block 404, sector-ring angles for the data values to be exhibited are determined according to the determined number of assistant axes and angles between axes.

According to an embodiment, if the number of assistant axes is determined using the expression (1), then the value of the sector-ring angle R for a data value to be exhibited is determined using the following expression (4).

$$R = D * \sqrt[N]{A_m} \quad (4)$$

In the expression (4), D indicates the angle between axes, N indicates the number of assistant axes (that is, the number of scale intervals), $A_m$ indicates a specific data value to be exhibited, and R indicates the determined value of the sector-ring angle. According to this embodiment, assuming that the group of data values to be exhibited is {2, 3, 5000, 20000}, the number of assistant axes is determined as N=[$\log_{2\pi}$200000]+1=7 using the expression (1), the angle between axes is determined as D=360/N=360/7=51.43° using the expression (3), and then the value of the sector-ring angle for the data of 5000 to be exhibited is determined as $$R = 51.43 \times \sqrt[7]{5000} = 173.7°$$

using the expression (4), thereby the values of the sector-ring angles for other respective data values to be exhibited can be determined.

According to another embodiment, if the number of assistant axes is determined using the expression (2), then the value of the sector-ring angle R for a data value to be exhibited is determined using the following expressions (5) and (6).

$$R=N'*D+[D*(Am-XN')/(XN'+1-XN')](N'\neq 0) \quad (5)$$

or $$R=D\times A/X(N'=0) \quad (6)$$

where $N'=[\log_X A_m]$.

In the expression (5), D is an angle between axes, X is the axis amplitude coefficient specified in the expression (2), N' is calculated by the expression (6), $A_m$ is a specific data value to be exhibited, and [ ] indicates rounding. According to this embodiment, assuming that the group of data values to be exhibited is {2, 3, 5000, 20000} and the numerical value of the base for logarithm is chosen as X=100, the number of assistant axes is determined as N=[$\log_{100}$200000]+1=3 using the expression (2), the angle between axes is determined as D=360/N=360/3=120° using the expression (3), N'=[$\log_{100}$5000]=1, and then the value of the sector-ring angle for the data value of 5000 to be exhibited is determined using the expressions (5) and (6): R=1×120+[120×4900/9900]=179.4°.

Next, at block 405, the data value is exhibited in a sector-ring manner by using the sector-ring angle for the data value to be exhibited.

Thus it can be seen that the sector-ring angles determined using the above embodiments for the data value to be exhibited are different. Accordingly, the final exhibition results according to the two embodiments are also different, but both sector-ring angles realize intervals with non-fixed scale coefficients. Therefore, no matter how large the data in a group of data values differ from each other, it is possible to exhibit all the data collectively in one graph effectively and clearly. Also, no matter how close to each other the data values are, it is possible to exhibit the comparison information between data values effectively and clearly. Those skilled in the art may employ other known algorithms to implement embodiments of the present invention.

It is further noted that, when the number of assistant axes is determined by using the expression (1) or (2), if there is a fractional value smaller than 1 in the data values to be exhibited, then the result of the logarithm calculation will be a negative value. In order to resolve this problem, it is only required to make a slight modification to the expression (1) or (2). Taking the expression (1) as an example, the expression (1) as given above is suitable for the case of $A_{min} \geq 1$ in which $A_{min}$ is the minimum value in the group of data values to be exhibited. When $0<A_{max}<1$, the number of assistant axes is determined by the following expression (7).

$$N=|[\log_X A_{max}]|+1 \quad (7)$$

When $0<A_{min}<1$ and $A_{max} \geq 1$, the number of assistant axes is determined by using the following expression (8).

$$N_1=[\log_X A_{max}]+1 \quad (8\text{-}1)$$

$$N_2=|[\log_X A_{min}]|+1 \quad (8\text{-}2)$$

$$N=N_1+N_2 \quad (8\text{-}3)$$

In the expressions (7) and (8), || indicates absolute value obtainment, and [ ] indicates rounding. In this way, even if there is a positive number smaller than 1 in the data to be exhibited, the number of assistant axes can be determined accordingly. Accordingly, when the positive number smaller than 1 is processed subsequently to use the expressions (4)-(6) to determine sector-ring angles for the data values to be exhibited, it is also required to make an adaptive modification to the expressions accordingly. Those skilled in the art are able to realize the modification to these mathematic expressions and therefore the detailed description thereof will not be provided herein.

Although the case of processing the data value of a positive number smaller than 1 has been discussed above with respect to only the expression (1), it should be understood by those skilled in the art that similar modification may also be made in the case of the expression (2) such that it can process the determination of the sector-ring angle for the data value of a positive number smaller than 1.

It is further noted that, when a data value of a negative number is processed, as described above, the absolute value thereof may be processed first to determine its corresponding sector-ring angle, and then the negative number is exhibited in the opposite sector-ring extension direction, as shown in FIG. 5B.

Figure 5C:
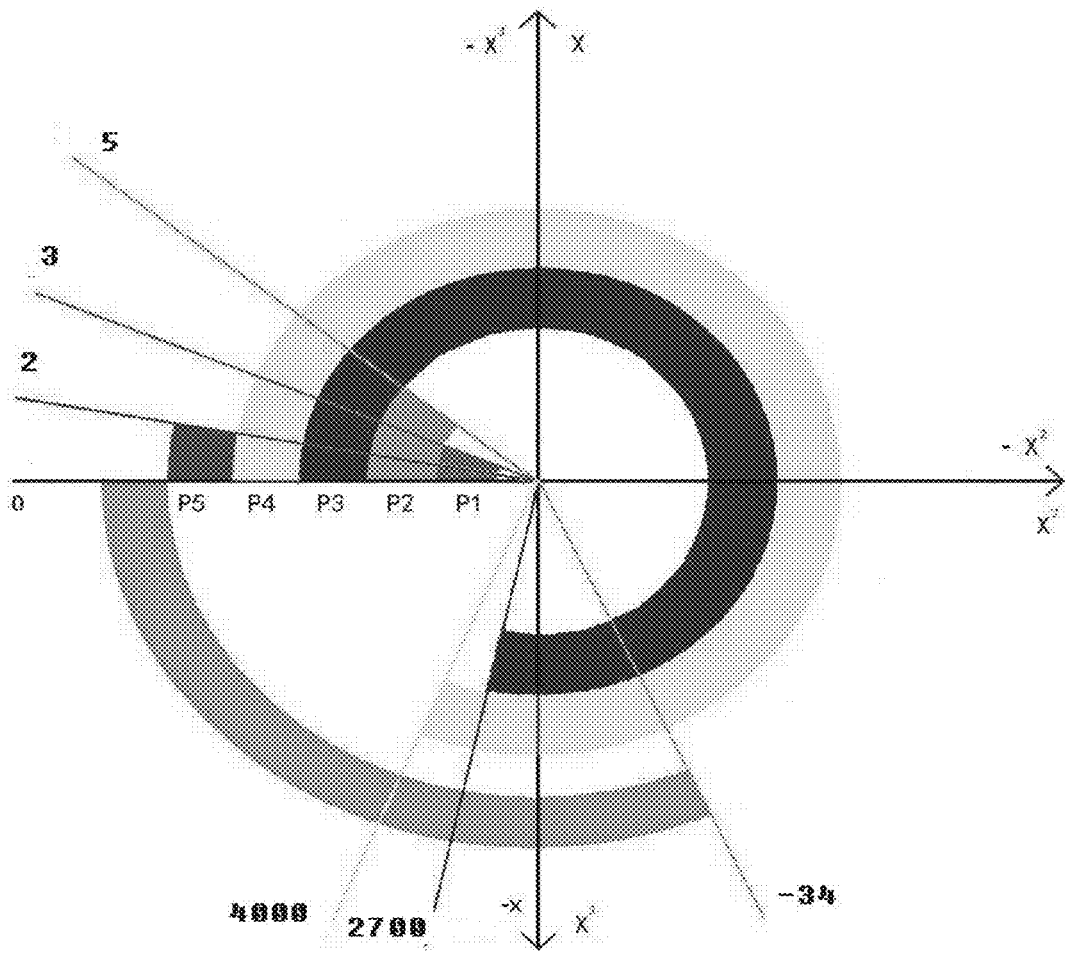
FIG. 5C shows an instance of exhibiting data values containing negative numbers with sector-ring angles according to an embodiment.

In order to explain embodiments more intuitively, the description is made of one specific instance containing a negative number and positive numbers in combination with FIG. 5C.

It is assumed that the group of data values to be exhibited is {2, 3, 2700, 4000, −34} and it is chosen that X=100, then $A_{max}$=4000, thus the number of assistant axes, that is, the number of scale intervals, is N=[log 104000]+1=4. Then, the angle between axes is determined as D=360/N=360/4=90° using the expression (3).

Next, for the data value of 2 to be exhibited, it is obtained that $N'=[\log_{10}2]=0$ by calculation using the expression (6), then the value of the sector-ring angle for the data of 2 to be exhibited is determined as $R=(D*A_m)/X=90*2/10=18°$ using the expression (5).

Similarly, for the data value of 3 to be exhibited, correspondingly $N'=[\log_{10}3]=0$, $R=(D*A_m)/X=90*3/10=27°$.

For the data value of 5 to be exhibited, the value of the sector-ring angle thereof is 45°. For the data value of 27 to be exhibited, the value of the sector-ring angle thereof is 287°. For the data value of 4000 to be exhibited, the value of the sector-ring angle thereof is 300°. For the data value of −34 to be exhibited, it is determined that $N'=[\log_{10}34]=1$ using the expression of $N'=[\log_x|A_m|]$, and the value of the sector-ring angle thereof is further obtained as 114° by calculation. In accordance with the value of the sector-ring angle, for each data value to be exhibited, obtained by calculation as described above, the group of data to be exhibited may be exhibited as shown in FIG. 5C. Since −34 is a negative number, the sector-ring extension direction thereof is opposite to those of other positive numbers at the time of exhibition.

Figure 6:
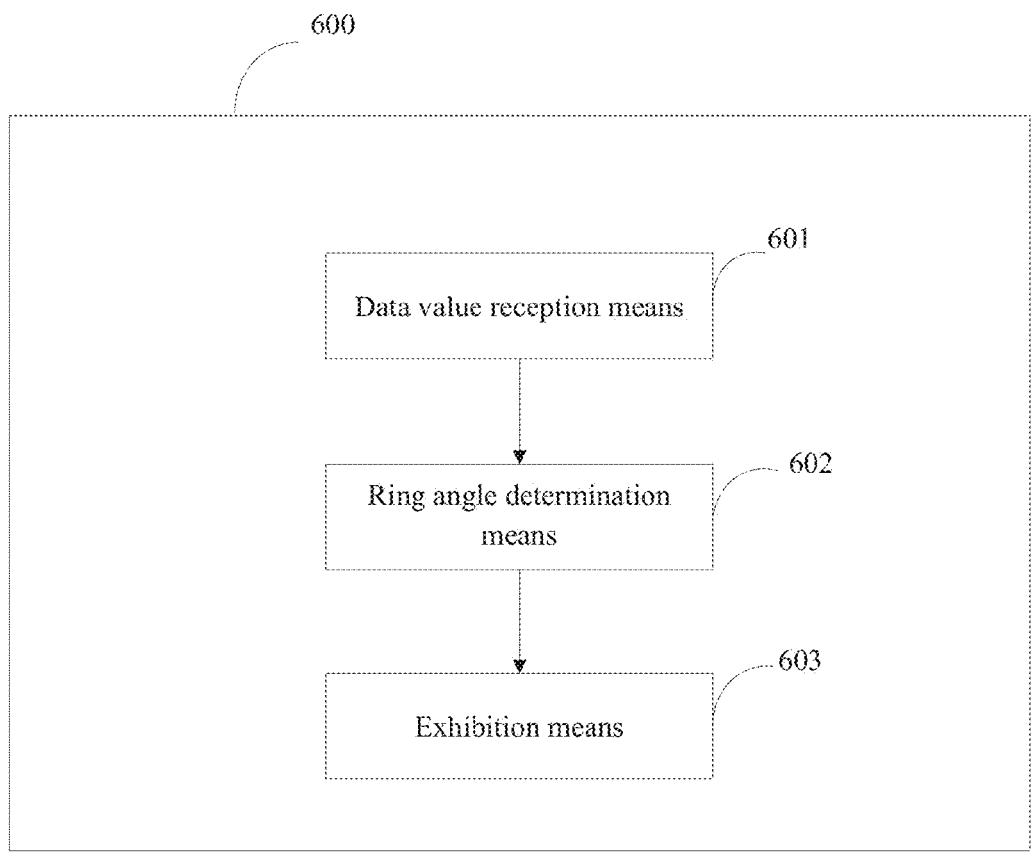
FIG. 6 shows a block diagram of a data exhibition system based on sector-ring angles according to an embodiment.

FIG. 6 shows a block diagram of a data exhibition system based on sector-ring angles according to an embodiment. The system shown in FIG. 6 is denoted by the system 600 as a whole. In particular, the system 600 includes a data value reception means 601 ("also referred to as a "data value reception device") which is configured to receive the data value to be exhibited; a ring angle determination means 602 (also referred to as a "ring angle determination device") which is configured to determine the sector-ring angle for the data value to be exhibited; and an exhibition means 603 (also referred to as an "exhibition device") which is configured to exhibit the data value in a sector-ring manner by using the sector-ring angle for the data value to be exhibited. It is understood that the means 601-603 in the system 600 correspond to blocks 301-303 in the method shown in FIG. 3 respectively and unnecessary details thereof will not be given herein.

According to an embodiment, there is provided a data exhibition method based on sector-ring angles, including receiving data values to be exhibited, determining the sector-ring angles for the data values to be exhibited, and exhibiting the data values in a sector-ring manner by using the sector-ring angles for the data values to be exhibited.

According to another embodiment, there is provided a data exhibition system based on sector-ring angles, including a data value reception means which is configured to receive data values to be exhibited, an angle determination means which is configured to determine the sector-ring angles for the data values to be exhibited, and an exhibition means which is configured to exhibit the data values in a sector-ring manner by using the sector-ring angles for the data values to be exhibited.

According to embodiments disclosed herein, with the data exhibition based on ring angles, no matter how large the data in a group of data values differs from each other, it is possible to exhibit all the data collectively in one graph clearly and effectively, and no matter how close to each other the data values are, it is possible to exhibit the comparison information between data values clearly and effectively.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The disclosed flowchart and block diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer-implemented method, comprising:
   receiving, by a processing device, data values to be exhibited;
   determining sector-ring angles for the data values to be exhibited using a plurality of scale intervals having different scale coefficients, the determining sector-ring angles for the data values to be exhibited using a plurality of scale intervals having different scale coefficients comprising:
      determining the number of assistant axes according to the data values to be exhibited, wherein the assistant axes indicate the boundaries of the respective scale intervals having different scale coefficients;
      determining an angle between axes for the assistant axes according to the determined number of axes, wherein the angle between axes indicate the ranges of the respective scale intervals having different scale coefficients; and
      determining the sector-ring angles for the data values to be exhibited according to the determined number of assistant axes and angle between axes; and
   exhibiting the data values in a sector-ring manner using the sector-ring angles for the data values to be exhibited.

2. The computer-implemented method according to claim 1, wherein the determining of the number of assistant axes according to the data values to be exhibited further comprises:
   determining the number of assistant axes by using the maximum value and the minimum value among the data values to be exhibited.

3. The computer-implemented method according to claim 1, wherein the determining of the number of assistant axes according to the data values to be exhibited further comprises:
   receiving a real-time specified value X for an axis amplitude coefficient; and
   calculating the number of axes according to a logarithm value with X as a base and with a maximum value among received data values to be exhibited as a power.

4. The computer-implemented method according to claim 1, wherein the determining of the number of assistant axes according to the data values to be exhibited further comprises:
   calculating the number of axes by using a logarithm value with a preset axis amplitude coefficient as a base and with a maximum value among received data values to be exhibited as a power, wherein the preset axis amplitude coefficient is $2\pi$.

5. The computer-implemented method according to claim 1, wherein the determining of the angle between axes according to the determined number of axes further comprises:
   calculating the angle between axes using the expression of D=360/N, where D is the angle between axes and N is the number of axes.

6. The computer-implemented method according to claim 4, wherein the determining of the sector-ring angles for the data values to be exhibited according to the determined number of assistant axes and angle between axes further comprises:
   calculating the ring angles for the data values to be exhibited by using the expression of $$R = \sqrt[N]{A_m}$$

where R is the ring angle for the data value to be exhibited, $A_m$ is the data value to be exhibited and N is the number of axes.

7. The computer-implemented method according to claim 1, wherein the exhibiting of the data values in a sector-ring manner further comprises:
   determining ring widths for exhibiting the data values; and
   exhibiting the data values in a ring manner in a plane rectangular coordinate system according to the sector-ring angles for the data values to be exhibited with a portion of the same axis of the plane rectangular coordinate system located at a same side of the origin as a start point.

8. The computer-implemented method according claim 1, wherein the exhibiting of the data values in a sector-ring manner further comprises:
   distinguishing different data values by using different ring colors; and
   denoting the data values by prolonged lines and numbers.

9. A computer system, comprising:
   a memory having computer readable instructions; and a processor for executing the computer readable instructions, the computer system comprising:
   a data value reception device configured to receive data values to be exhibited;
   an angle determination device configured to determine sector-ring angles for the data values to be exhibited using a plurality of scale intervals having different scale coefficients, the determining sector-ring angles for the data values to be exhibited using a plurality of scale intervals having different scale coefficients comprising:
      determining the number of assistant axes according to the data values to be exhibited, wherein the assistant axes indicate the boundaries of the respective scale intervals having different scale coefficients;
      determining an angle between axes for the assistant axes according to the determined number of axes, wherein the angle between axes indicate the ranges of the respective scale intervals having different scale coefficients; and
      determining the sector-ring angles for the data values to be exhibited according to the determined number of assistant axes and angle between axes; and
   an exhibition device configured to exhibit the data values in a sector-ring manner using the sector-ring angles for the data values to be exhibited.

10. The computer system according to claim 9, wherein the number-of-axes determination device is further configured to:
   determine the number of assistant axes by using the maximum value and the minimum value among the data values to be exhibited.

11. The computer system according to claim 9, wherein the number-of-axes determination device is further configured to:
   receive a real-time specified value X for an axis amplitude coefficient; and
   calculate the number of axes according to a logarithm value with X as a base and with a maximum value among the received data values to be exhibited as a power.

12. The computer system according to claim 9, wherein the number-of-axes determination device is further configured to:
   calculate the number of axes by using a logarithm value with a preset axis amplitude coefficient as a base and with a maximum value among received data values to be exhibited as a power, wherein the preset axis amplitude coefficient is $2\pi$.

13. The computer system according to claim 9, wherein the angle-between-axes determination device is further configured to:
   calculate the angle between axes using the expression of D=360/N where D is the angle between axes and N is the number of axes.

14. The computer system according to claim 12, wherein the ring angle determination device is further configured to:
   calculate the ring angles for the data values to be exhibited by using the expression of $$R = \sqrt[N]{A_m}$$

where R is the ring angle for the data value to be exhibited, $A_m$ is the data value to be exhibited and N is the number of axes.

15. The computer system according to claim 9, wherein the exhibition device is further configured for:
   determining ring widths for exhibiting the data values; and
   exhibiting the data values in a ring manner in a plane rectangular coordinate system according to the sector-ring angles for the data values to be exhibited with a portion of the same axis of the plane rectangular coordinate system located at a same side of the origin as a start point.

16. The computer system according to claim 9, wherein the exhibition device is further configured for:
   distinguishing different data values by using different ring colors; and
   denoting the data values by prolonged lines and numbers.

* * * * *